United States Patent
Baik et al.

(10) Patent No.: US 12,422,848 B2
(45) Date of Patent: Sep. 23, 2025

(54) ROBOT AND METHOD FOR GENERATING MAP THEREBY

(71) Applicant: SAMSUNG ELECTRONICS CO., LTD., Suwon-si (KR)

(72) Inventors: Aron Baik, Suwon-si (KR); Soonbeom Kwon, Suwon-si (KR); Dohoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 18/135,540

(22) Filed: Apr. 17, 2023

(65) Prior Publication Data

US 2023/0251663 A1   Aug. 10, 2023

Related U.S. Application Data

(63) Continuation of application No. PCT/KR2021/014533, filed on Oct. 19, 2021.

(30) Foreign Application Priority Data

Dec. 3, 2020   (KR) .......................... 10-2020-0167645

(51) Int. Cl.
G05D 1/00   (2024.01)

(52) U.S. Cl.
CPC ......... G05D 1/0212 (2013.01); G05D 1/0238 (2013.01); G05D 1/0274 (2013.01)

(58) Field of Classification Search
CPC .. G05D 1/0212; G05D 1/0238; G05D 1/0274; G05D 1/024; B25J 11/00; B25J 9/161; B25J 9/1664; B25J 9/1694
See application file for complete search history.

(56) References Cited

U.S. PATENT DOCUMENTS

| 7,085,624 B2 | 8/2006 | Aldred et al. |
| 8,954,191 B2 | 2/2015 | Yi et al. |

(Continued)

FOREIGN PATENT DOCUMENTS

| JP | 2012-212412 A | 11/2012 |
| JP | 6710521 B2 | 6/2020 |

(Continued)

OTHER PUBLICATIONS

Young-Ho Choi et al: "A line feature based SLAM with low grade range sensors using geometric constraints and active exploration for mobile robot", Autonomous Robots, Kluwer Academic Publishers, BO, vol. 24, No. 1, Oct. 19, 2007 (Oct. 19, 2007), pp. 13-27, XP019548472, ISSN: 1573-7527 (Year: 2007).*

(Continued)

*Primary Examiner* — Yuen Wong
(74) *Attorney, Agent, or Firm* — Sughrue Mion, PLLC

(57) ABSTRACT

A robot includes: a sensor configured to sense an environment of the robot; a driver configured to drive movement of the robot; at least one memory; and at least one processor configured to: based on identifying at least one wall through the sensor, control the driver to cause the robot to perform wall following in which the robot travels along the at least one wall, generate a map of an explored area by exploring an area in a vicinity of the robot through the sensor while the robot travels, store information on the generated map in the at least one memory, and based on the robot completing the wall following, control the driver to cause the robot to move to an exploration point in an unexplored area in the vicinity of the robot.

17 Claims, 21 Drawing Sheets

(56) References Cited

U.S. PATENT DOCUMENTS

| | | | |
|---|---|---|---|
| 9,429,431 | B2 | 8/2016 | Fleizach et al. |
| 9,773,020 | B2 | 9/2017 | Kerr et al. |
| 9,877,630 | B2 | 1/2018 | Wolfe et al. |
| 9,918,605 | B2 | 3/2018 | Wolfe et al. |
| 10,405,766 | B2 | 9/2019 | Stewart et al. |
| 10,537,221 | B2 | 1/2020 | Wolfe et al. |
| 11,278,175 | B2 | 3/2022 | Wolfe et al. |
| 11,467,603 | B2 | 11/2022 | Kim et al. |
| 2006/0020369 | A1* | 1/2006 | Taylor ............... A47L 9/009 318/568.12 |
| 2009/0292394 | A1* | 11/2009 | Hyung ............... G05D 1/027 700/251 |
| 2010/0228394 | A1 | 9/2010 | Yi et al. |
| 2012/0195491 | A1 | 8/2012 | Zhang et al. |
| 2016/0271795 | A1 | 9/2016 | Vicenti |
| 2016/0296092 | A1 | 10/2016 | Wolfe et al. |
| 2016/0299503 | A1 | 10/2016 | Wolfe et al. |
| 2017/0131721 | A1 | 5/2017 | Kwak et al. |
| 2018/0228333 | A1 | 8/2018 | Wolfe et al. |
| 2019/0321979 | A1 | 10/2019 | Ahn |
| 2019/0332121 | A1 | 10/2019 | Kim et al. |
| 2020/0146525 | A1 | 5/2020 | Wolfe et al. |
| 2022/0080592 | A1* | 3/2022 | Karapetyan ......... G05D 1/0227 |

FOREIGN PATENT DOCUMENTS

| | | |
|---|---|---|
| KR | 10-0715609 B1 | 5/2007 |
| KR | 10-1524020 B1 | 5/2015 |
| KR | 10-2017-0053351 A | 5/2017 |
| KR | 10-1849972 B1 | 5/2018 |
| KR | 10-2018-0082264 A | 7/2018 |
| KR | 10-2019-0119234 A | 10/2019 |
| KR | 10-2020-0100019 A | 8/2020 |
| KR | 10-2021-0113902 A | 9/2021 |

OTHER PUBLICATIONS

Gomez, C., et al., "Topological Frontier-Based Exploration and Map-Building Using Semantic Information", Sensors, (Published: Oct. 22, 2019), 20 pages. www.mdpi.com/journal/sensors.

International Search Report (PCT/ISA/210) issued by the International Searching Authority on Jan. 5, 2022 in International Application No. PCT/KR2021/014533.

Written Opinion (PCT/ISA/237) issued by the International Searching Authority on Jan. 5, 2022 in International Application No. PCT/KR2021/014533.

Communication dated Mar. 11, 2024, issued by the European Patent Office in European Application No. 21900802.6.

Choi et al., "A line feature based SLAM with low grade range sensors using geometric constraints and active exploration for mobile robot", Autonomous Robots, Kluwer Academic Publishers, Oct. 19, 2007, vol. 24, No. 1, pp. 13-27 (15 pages total).

Liu et al., "Real-time Outline Mapping for Mobile Blind Robots", 2011 IEEE International Conference on Robotics and Automation, May 9, 2011, pp. 1503-1510 (8 pages total).

Communication dated Jun. 13, 2025 issued by the European Patent Office in European Patent Application No. 21900802.6.

* cited by examiner

ROBOT AND METHOD FOR GENERATING MAP THEREBY

CROSS-REFERENCE TO RELATED APPLICATIONS

This application is a by-pass continuation of International Application No. PCT/KR2021/014533, filed on Oct. 19, 2021, which is based on and claims priority to Korean Patent Application No. 10-2020-0167645, filed on Dec. 3, 2020, in the Korean Intellectual Property Office, the disclosures of which are incorporated by reference herein in their entireties.

BACKGROUND

1. Field

The disclosure relates to a robot and a method for generating a map thereby and, more particularly, to a robot for generating a map and a method for generating a map thereby.

2. Description of Related Art

In general, robots have been developed for and are widely used in various industrial sites. Recently, the fields using a robot have further expanded, and thus robot are used not only in the family home, but also in various retail environments.

A robot may move in a space by using a map of a space in which the robot is located. For this, the robot may generate a map by exploring the surrounding environment.

In this case, the more accurate the map is, the more accurate the robot can travel, therefore there is a need for a way to generate a more precise and accurate map.

SUMMARY

Provided are a robot capable of performing wall following when generating a map and a method for generating a map thereby.

According to an aspect of the disclosure, a robot includes: a sensor configured to sense an environment of the robot; a driver configured to drive movement of the robot; at least one memory; and at least one processor configured to: based on identifying at least one wall through the sensor, control the driver to cause the robot to perform wall following in which the robot travels along the at least one wall, generate a map of an explored area by exploring an area in a vicinity of the robot through the sensor while the robot travels, store information on the generated map in the at least one memory, and based on the robot completing the wall following, control the driver to cause the robot to move to an exploration point in an unexplored area in the vicinity of the robot.

The at least one processor may be further configured to: store information related to the at least one wall in the at least one memory, and control, based on the stored information related to the at least one wall, the driver to cause the robot to perform the wall following.

The at least one processor may be further configured to: based on identifying a plurality of walls through the sensor, determine priorities of the plurality of walls based on corner directions of each wall of the plurality of walls and a distance between each wall of the plurality of walls and the robot, and store information related to the plurality of walls in the at least one memory according to the priorities.

The at least one processor may be further configured to: identify the at least one wall, from among the plurality of walls, based on the at least one wall having a corner direction facing the robot, determine that the at least one wall having the corner direction facing the robot has a higher priority than remaining walls among the plurality of walls, determine that the at least one wall has a higher priority than a wall closest to the robot from among the plurality of walls, and determine, for each respective remaining wall of the plurality of walls other than the at least one wall, that the respective remaining wall has a higher priority than the wall closest to the robot.

The at least one processor may be further configured to, based on the priorities of the plurality of walls and the stored information related to the plurality of walls, control the driver to cause the robot to sequentially perform wall following along each wall of the plurality of walls.

The at least one processor may be further configured to, based on identifying a new wall through the sensor while the robot performs the wall following along the at least one wall, store information on the new wall in the at least one memory and control the driver to cause the robot to perform wall following along the new wall based on the stored information.

The at least one processor may be further configured to: based on information obtained through the sensor, identify that the robot has returned to a position where the wall following along the at least one wall began, and based on the identifying that the robot has returned to the position where the wall following along the at least one wall began, determine that the wall following along the at least one wall is complete.

The at least one processor may be further configured to, based on at least one of the robot moving a predetermined distance from a position where the wall following along the at least one wall began, a predetermined time elapsing from a time when the wall following along the at least one wall began, or a moving direction of the robot remaining unchanged for a predetermined time after the wall following along the at least one wall began, control the driver to cause the robot to stop the wall following along the at least one wall.

The at least one processor may be further configured to: identify a boundary between the explored area and the unexplored area, and the exploration point may be located on the boundary.

The at least one processor may be further configured to, based on identifying at least one wall through the sensor while the robot moves to the exploration point, control the driver to cause the robot to travel along the at least one wall.

According to an aspect of the disclosure, a method of generating a map using a robot including a sensor, includes: identifying at least one wall through the sensor of the robot; performing wall following in which the robot travels along the at least one wall; generating a map of an explored area by exploring an area in the vicinity of the robot through the sensor while the robot travels; storing information on the generated map in a memory of the robot; and based on the robot completing the wall following, moving the robot to an exploration point in an unexplored area in the vicinity of the robot.

The performing wall following may include storing information related to the at least one wall and performing the wall following along the at least one wall based on the stored information.

The method may further include: identifying a plurality of walls through the sensor including the at least one wall; based on the identifying the plurality of walls through the sensor, determining priorities of the plurality of walls based on corner directions of each wall of the plurality of walls and a distance between each wall of the plurality of walls and the robot; and storing information related to the plurality of walls in the memory according to the priorities.

The identifying the at least one wall through the sensor further may include: identifying the at least one wall, from among the plurality of walls, based on the at least one wall having a corner direction facing the robot; determining that the at least one wall having the corner direction facing the robot has a higher priority than remaining walls among the plurality of walls; determining that the at least one wall has a higher priority than a wall closest to the robot from among the plurality of walls; and determining, for each respective remaining wall of the plurality of walls other than the at least one wall, that the respective remaining wall has a higher priority than the wall closest to the robot.

The method may further include, based on the robot completing the wall following, sequentially performing wall following along each remaining wall of the plurality of walls based on the priorities and the stored information.

According to one or more embodiments of the disclosure, when a robot generates a map, a map with improved accuracy may be generated in that the robot generates a map around the robot while the robot is moving to form a loop through wall following.

BRIEF DESCRIPTION OF THE DRAWINGS

The above and other aspects, features, and advantages of certain embodiments of the present disclosure will be more apparent from the following description taken in conjunction with the accompanying drawings, in which.

disclosure.

DETAILED DESCRIPTION

Figure 1:
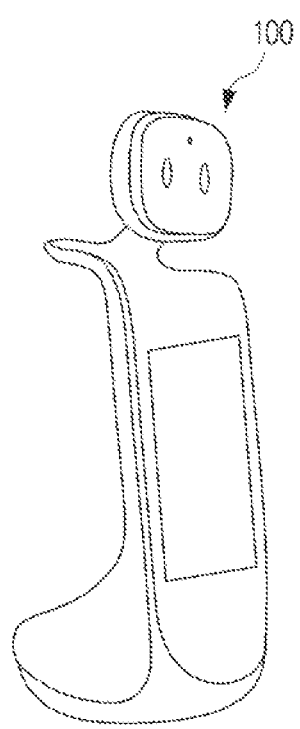
FIG. 1 is a diagram illustrating a robot according to an embodiment of the disclosure.

The disclosure may have various modifications and includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, well-known functions or constructions are not described in detail since they would obscure the disclosure with unnecessary detail.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

It is to be understood that the terms such as "comprise" may, for example, be used to designate a presence of a characteristic, number, step, operation, element, component, or a combination thereof, and not to preclude a presence or a possibility of adding one or more of other characteristics.

In this document, the expressions "A or B," "at least one of A and/or B," or "one or more of A and/or B," and the like include all possible combinations of the listed items. For example, "A or B," "at least one of A and B," or "at least one of A or B" includes (1) only A, (2) only B, or (3) both A and B.

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

The expression "configured to" used in the disclosure may be interchangeably used with other expressions such as "suitable for," "having the capacity to," "designed to," "adapted to," "made to," and "capable of," depending on cases. The term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

In an embodiment, the term such as "module," "unit," "part", and so on may refer, for example, to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

In the meantime, various elements and regions in the figures may be shown out of scale. Accordingly, the scope of the disclosure is not limited by the relative sizes or spacing drawn from the accompanying drawings.

Hereinafter, with reference to the attached drawings, embodiments will be described in detail so that those skilled in the art to which the disclosure belongs to can easily make and use the embodiments.

FIG. 1 is a diagram illustrating a robot according to an embodiment of the disclosure.

Referring to FIG. 1, a robot 100 according to an embodiment may be various types of robots.

For example, the robot 100 may be implemented as a retail robot or a guide robot. That is, the robot 100 may guide a path to a user in a store, describe a product in the store to a user, or perform a function of carrying a user's object and moving along the user in the store.

In this case, the robot 100 may move by using a map of a space in which the robot 100 is located. For example, the robot 100 may identify a location of the robot 100 on the map based on information obtained through the sensor, and move in the space by using the map and the location of the robot 100 on the map.

To this end, the robot 100 may generate a map for a space in which the robot 100 is located. In particular, according to an embodiment of the disclosure, when generating a map, the robot 100 may generate a more precise map by forming a loop closing through wall following, and this will be described in more detail below.

Figure 2:
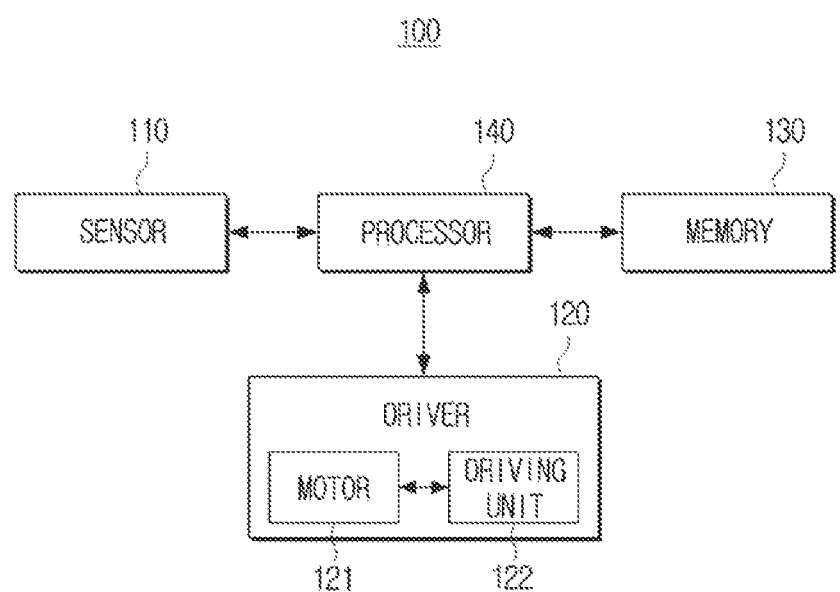
FIG. 2 is a block diagram illustrating a configuration of a robot according to an embodiment of the disclosure.

FIG. 2 is a block diagram illustrating a configuration of a robot according to an embodiment of the disclosure.

Referring to FIG. 2, the robot 100 according to an embodiment may include a sensor 110, a driver 120, a memory 130, and a processor 140.

The sensor 110 may obtain various information related to the robot 100 and the surroundings of the robot 100.

For example, the sensor 110 may include a light detection and ranging (LiDAR) sensor or a laser distance sensor (LDS). When the LiDAR sensor irradiates laser and the irradiated laser is reflected from an object (or an obstacle) around the robot 100 and received, the LiDAR sensor may detect a distance from the object based on the time when the laser is received, or may detect a distance from the object by measuring a phase change amount of the received laser.

In addition, the sensor 110 may include a visual sensor. The visual sensor may include at least one of a 3D sensor and a camera. The 3D sensor is a sensor capable of sensing a surrounding environment by using a stereo camera composed of a plurality of cameras, and may detect a distance between the robot 100 and an object around the robot 100. The camera may obtain an image by capturing the surroundings of the robot 100. In this case, the robot 100 may recognize an object from an image obtained through the camera to obtain information about the type, shape, size, and the like of the object.

Further, the sensor 110 may include a gyro sensor. The gyro sensor may detect angular velocity of the robot 100.

In addition, the sensor 110 may include an encoder. The encoder may sense the number of rotations of a wheel installed in the robot 100 for movement of the robot 100.

As such, according to an embodiment, the sensor 110 may include various sensors.

The driver 120 is a component for moving the robot 100. The driver 120 may include a motor 121 and a driving unit 122 connected to the motor 121. The driving unit 122 may be implemented as a wheel or a leg of a robot. The motor 121 may control the driving unit 122 to control various driving operations such as movement, stop, speed control, and direction change of the robot 100.

The memory 130 may store at least one instruction related to the robot 100. The memory 130 may store an Operating System (O/S) for driving the robot 100. In addition, various software programs or applications for operating the robot 100 may be stored in the memory 130 according to various embodiments of the disclosure. The memory 130 may include a volatile memory such as a frame buffer, a semiconductor memory such as a flash memory, or a magnetic storage medium such as a hard disk.

Specifically, various software modules for operating the robot 100 may be stored in the memory 130 according to various embodiments of the disclosure, and the processor 140 may control the operation of the robot 100 by executing various software modules stored in the memory 130. The memory 130 is accessed by the processor 140 and reading/writing/modifying/deleting/updating of data by the processor 140 may be performed.

In the disclosure, the term memory may include the memory 130, read-only memory (ROM) in the processor 140, RAM, or a memory card (for example, a micro secure digital (SD) card, and a memory stick) mounted to the robot 100.

Particularly, the memory 130 may store various data used for generating a map and data on the generated map.

The processor 140 controls the overall operation of the robot 100. Specifically, the processor 140 is connected to the configuration of the robot 100 including the sensor 110, the driver 120, and the memory 130, and executes at least one instruction stored in the memory 130 to control the overall operation of the robot 100.

First, the processor 140 may control the driver 120 so that the robot 100 moves. Specifically, the processor 140 transmits a control signal to the motor 121, drives the driving unit 122 through the motor 121, and moves the robot 100 by driving the driving unit 122. Accordingly, the robot 100 may perform various driving operations such as movement, stop, speed control, and direction conversion.

In this case, the processor 140 may identify the distance from the robot 100 to the object based on the information obtained through the sensor 110, and control the driver 120 so that the robot 100 moves without colliding with the object based on the identified distance.

For example, when an object is detected in front of the robot 100 through the LiDAR sensor, the processor 140 may transmit, to the motor 121, a control signal for changing the traveling direction at a point where the robot 100 is spaced apart from the object at a predetermined distance by using a distance from the detected object. Accordingly, the robot 100 may not collide with the object and may move while avoiding the object.

In the meantime, the processor 140 may generate a map for a space in which the robot 100 is located, and store the generated map in the memory 130.

In this case, the processor 140 may generate a map using a simultaneous localization and mapping (SLAM) algorithm.

For example, the processor 140 may set a position (e.g., coordinates) at which the robot 100 starts travelling to generate a map and a rotation angle of the robot 100 as a reference position and a reference rotation angle, respectively.

In addition, while the robot 100 is travelling to generate a map, the processor 140 may obtain a position (e.g., coordinates) and a rotation angle of the moved robot 100 by using at least one of a distance between the robot 100 and an object located around the robot 100 obtained through the sensor 110, an image obtained by capturing the surroundings of the robot, a rotation angle of the robot 100, and a movement distance of the robot 100. In this case, the processor 140 may obtain information on the distance between the robot 100 and an object located around the robot 100 through at least one of the LiDAR sensor and the 3D sensor. In addition, the processor 140 may obtain an image by capturing the surroundings of the robot 100 through a camera. The processor 140 may calculate the rotation angle of the robot 100 based on the angular velocity of the robot 100 obtained through the gyro sensor, and calculate the movement distance of the robot 100 based on the number of rotations of the wheels obtained through the encoder.

In the meantime, the processor 140 may explore an area around the robot 100 through the sensor 110 while the robot 100 moves from the reference position to the obtained position, and generate a map of an area around the robot 100 by using the explored information.

For example, while the robot 100 moves from a reference position to the obtained position, the processor 140 may identify a distance between the robot 100 and an object through at least one of the LiDAR sensor and the 3D sensor, and identify coordinate values that the robot 100 moved from the reference position to the obtained position. The processor 140 may identify a position (e.g., coordinates) of the object using the identified distance from the object according to the coordinate values that the robot 100 moved, and generate a map for an area around the robot 100 by using the identified position of the object. In this case, the processor 140 may obtain information on the type, shape, size, and the like of an object around the robot 100 by using an image obtained through the camera, and generate a map for an area around the robot 100 by using the obtained information.

In addition, the processor 140 may use exploration algorithm when generating a map.

Here, the exploration algorithm may refer to an algorithm for generating a map by, after exploring an area in a space, exploring an area that has not yet been explored (i.e., an unexplored area). In this case, an area in which the robot 100 is explored is referred to as a free space, and an unexplored area may be referred to as an unknown space.

In this case, the processor 140 may control the driver 120 so that the robot 100 explores an area in a space and then moves to an unexplored area.

Specifically, the processor 140 may identify a boundary (that is, a frontier) between the explored area and the unexplored area, identify one point (e.g., coordinates) on the boundary as an exploration point, and control the driver 120 such that the robot 100 moves to the exploration point. For example, the processor 140 may identify a point closest to the robot 100 among a plurality of points on the boundary as an exploration point. As another example, the processor 140 may identify, as an exploration point, a point on a boundary so that the unexplored area may be explored as quickly as possible based on at least one of a search range through the sensor 110, a position of the robot 100, a position of the explored area, and a position of the unexplored area. However, this is merely an example, and the processor 140 may identify an exploration point by using various methods.

In addition, while the robot 100 moves to the exploration point or after the robot 100 moves to the exploration point, the processor 140 may explore an area around the robot 100 by using information obtained through the sensor 110, and generate a map for an area around the robot 100 by using the explored information.

As a result, the processor 140 may explore areas in a space using the above method to generate a map for the space. The processor 140 may store the generated map in the memory 130.

In the meantime, according to an embodiment of the disclosure, when exploring an area, the processor 140 may control the driver 120 to perform wall following.

Herein, wall following may mean an operation that the robot 100 travels along a wall present in the space.

Specifically, when at least one wall is identified through the sensor 110, the processor 140 may control the driver 120 so that the robot 100 performs wall following in which the robot 100 travels along the identified wall.

Herein, the wall may mean a wall that the robot 100 has not yet performed the exploration, that is, an unexplored wall.

As described above, the processor 140 may detect an object located around the robot 100 based on information obtained through the sensor 110 to explore an area around the robot 100, and generate a map for an area around the robot 100 by using information on the detected object.

In this case, the processor 140 may determine that the detected object is an unexplored wall when the object detected through the sensor 110 is a wall which the robot 100 has not explored.

Specifically, when a map is generated, when the robot 100 explores an object, information on a corresponding object may be included in the map. Therefore, the processor 140 may identify that the object detected through the sensor 110 is an object that the robot 100 does not explore when the information about the sensed object does not exist in the map or the robot 100 does not travel around the sensed object.

In addition, the processor 140 may identify whether an object detected through the sensor 110 corresponds to a wall. For example, the processor 140 may identify the width of an object detected by using at least one of a LiDAR sensor and a 3D sensor, and identify that the sensed object is a wall when the identified width is greater than or equal to a preset value. As another example, the processor 140 may recognize an object by using an image obtained through a camera to identify whether the detected object is a wall.

Accordingly, the processor 140 may identify an unexplored wall present around the robot 100.

In addition, when at least one wall is identified, the processor 140 may store information on at least one wall in the memory 130.

In this case, the processor 140 may sequentially store information on at least one wall in a queue. Here, the queue may include a first-in-first-out (FIFO) structure in which first input data is first output, and the queue may include a processing order of information on a wall.

For example, when one wall is identified, the processor 140 may store location information (e.g., coordinates of a wall) of the identified wall in a queue. In this case, when the information is already stored in the queue, the processor 140 may store the location information of the identified wall in the next order of pre-stored information, and when the information is not stored in the queue, the processor 140 may store the location information of the identified wall in the first order in the queue.

When a plurality of walls are identified, the processor 140 may determine priorities of the plurality of walls and store information on the plurality of walls in the memory 130 according to the priorities.

In this case, the processor 140 may determine priorities of the plurality of walls based on the corner directions of the plurality of walls and the distances between the plurality of walls and the robot 100.

Specifically, the processor 140 may identify at least one wall, from among the plurality of walls, of which the corner direction faces the robot 100, and determine that at least one wall of which corner direction faces the robot 100 has a higher priority than the remaining walls.

To do this, the processor 140 may identify a direction in which the corner of the wall faces based on the information obtained through the sensor 110.

For example, the processor 140 may identify the corner of the wall and corner shape by using the distance between the wall and the robot 100 obtained through at least one of the LiDAR sensor and the 3D sensor. As another example, the processor 140 may identify the corner of the wall and the corner shape from an image obtained through a camera.

In these cases, the processor 140 may determine whether the corner direction of the wall faces the robot 100 based on the identified corner shape.

For example, when the corner of the wall has a shape protruded in the direction of the robot 100, the processor 140 may determine that the corner of the wall faces the robot 100, and when the corner of the wall has a shape protruded in a direction away from the robot 100, the processor 140 may determine that the corner of the wall does not face the robot 100.

Figure 3:
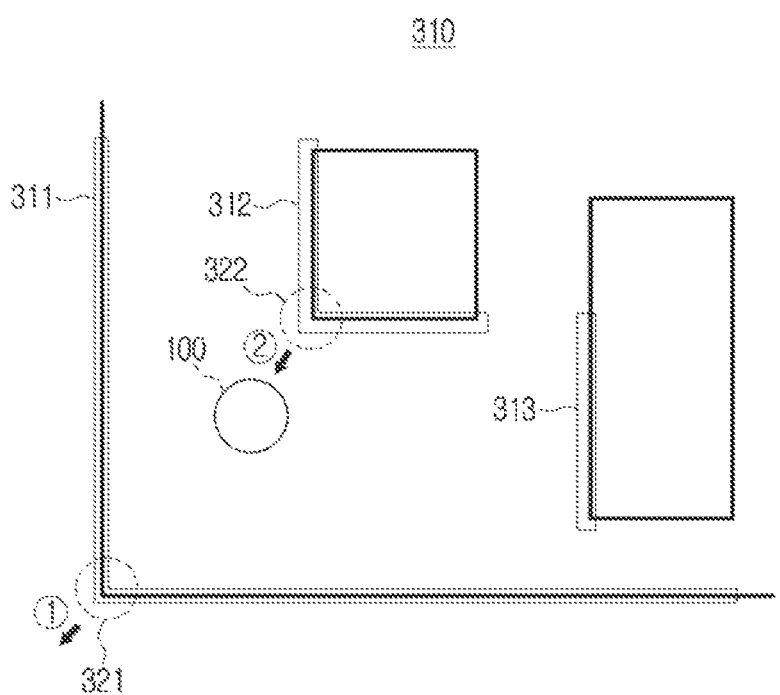
FIG. 3 is a diagram illustrating a method of determining a priority of a plurality of walls according to an embodiment of the disclosure.

For example, as shown in FIG. 3, it is assumed that the robot 100 is located in a space 310. In this case, the processor 140 may identify the walls 311, 312, and 313 that are not explored around the robot 100, and identify a wall of which the corner faces the robot 100 from among the unexplored walls 311, 312, and 313.

For example, referring to FIG. 3, a corner 322 of a wall 312 protrudes in a direction (i.e., ② direction) facing the robot 100, while a corner 321 of the wall 311 protrudes in a direction (i.e., ① direction) away from the robot 100. In the case of the wall 313, the corner of the wall 313 is not detected in that the robot 100 is in a position where the corner of the wall 313 cannot be detected.

In this case, the processor 140 may determine that the wall 312, from among the walls 311, 312, 313, of which the corner faces the robot 100 has a higher priority than the remaining walls 311, 313.

In the meantime, the processor 140 may determine that the wall has a high priority in the order of walls close to the robot 100 with respect to at least one wall of which the corner direction faces the robot 100. That is, when there are a plurality of walls of which the corner directions face the robot 100, the processor 140 may determine that the wall has a high priority in the order of walls close to the robot 100. The processor 140 may obtain a distance between each of the walls and the robot 100 by using at least one of the LiDAR sensor and the 3D sensor.

The processor 140 may determine that the robot 100 has a high priority in the order of wall close to the robot 100, with respect to the remaining walls (here, the remaining walls may include at least one of a wall where the corner direction does not face the robot 100 and a wall on which the corner is not detected). That is, when there are a plurality of remaining walls, the processor 140 may determine that the wall has a high priority in the order of walls close to the robot 100. The processor 140 may obtain a distance between each of the walls and the robot 100 by using at least one of the LiDAR sensor and the 3D sensor.

As described above, when a plurality of walls are identified around the robot 100, the processor 140 may determine that the wall of which corner direction faces the robot 100 and closer to the robot 100 has a higher priority, and determine that the wall of which corner direction does not face the robot 100 or the corner is not detected, and is farther from the robot 100 has a lower priority.

For example, referring to FIG. 3, the processor 140 may determine that the wall 312, from among the unexplored walls 311, 312, 313, of which the corner faces the robot 100, has the highest priority. The processor 140 may determine that, between the wall 311 where the corner is not directed toward the robot 100 and the wall 311 where the corner is not detected, a wall 311 having a relatively close distance to the robot 100 has a priority next to the wall 312, and determine that the wall 313 has the lowest priority.

In addition, the processor 140 may sequentially store information on the plurality of identified walls in a queue according to a priority. That is, the processor 140 may sequentially store the location information of the plurality of identified walls in a queue in the order of higher priority. In this case, when the information is already stored in the queue, the processor 140 may sequentially store the location information of the plurality of identified walls from the next order of pre-stored information, when the information is not stored in the queue, store the location information of the wall having the highest priority in the first order in the queue, and then sequentially store the location information of the wall in the queue in the order of higher priority.

The processor 140 may control the driver 120 to perform wall following regarding the identified wall based on the stored information.

Specifically, the processor 140 may control the driver 120 to sequentially perform wall following from a wall having the highest priority among the identified walls based on the stored information.

That is, the processor 140 may obtain, from the queue, location information of a wall arranged in the first order in the queue according to the order of location information of the wall stored in the queue, and control the driver 120 so that the robot 100 moves to the wall by using the obtained location information. Accordingly, when the robot 100 approaches the wall, the processor 140 may control the driver 120 so that the robot 100 moves to a point spaced apart from the wall by a predetermined distance based on a distance between the robot 100 and the wall obtained through the sensor 110, and control the driver 120 so that the robot 100 moves along the wall at the point spaced apart from the wall by a predetermined distance. Accordingly, the robot 100 performs wall following regarding the wall.

In addition, the processor 140 may obtain, from the queue, location information of a wall arranged in the next order in the queue when wall following regarding the wall is completed or wall following regarding the wall is interrupted, and control the driver 120 to perform wall following regarding the wall by using the obtained location information.

According to the method, the robot 100 may sequentially obtain location information of a wall stored in a queue from a queue, and may sequentially perform wall following regarding the wall by using the obtained location information.

The processor 140 may identify whether to perform wall following regarding the wall based on the location information of the exploration point and the location information of the wall obtained from the queue.

Specifically, the processor 140 may identify an exploration point on a boundary between the explored area and the unexplored area, compare the location of the exploration point with the location of the wall, and control the driver 120 to perform wall following regarding the wall when the wall is closer to the robot 100 than the exploration point. When the wall is farther from the robot 100 than the exploration point, the processor 140 may control the driver 120 to move to the exploration point without performing wall following regarding the wall.

In addition, the processor 140 may perform wall following regarding the wall, or move to the exploration point, and then obtain location information of a wall arranged in next order in the queue from the queue, identify whether to perform wall following regarding the wall based on the location information of the other exploration point identified at the current location of the robot 100 and the location information of the wall obtained from the queue, and control the driver 120 to perform wall following regarding the wall or move to another exploration point based on the information.

While the robot 100 is traveling, that is, while the robot 100 performs wall following, the processor 140 may generate a map for an explored area by exploring an area around the robot 100 through the sensor 110. In addition, the processor 140 may store information on the generated map in the memory 130.

That is, while the robot 100 is performing wall following, the processor 140 may detect an object located around the robot 100 by exploring around the robot 100 using at least one of a distance between the robot 100 and an object around the robot 100 obtained through the sensor 110 and an image obtained by capturing the surroundings of the robot 100, and may generate a map for an area around the robot 100 by using information on the detected object. In this case, the processor 140 may obtain information on the distance between the robot 100 and an object through at least one of the LiDAR sensor and the visual sensor. In addition, the processor 140 may obtain an image by capturing the surroundings of the robot 100 through a camera.

If a new wall is identified through the sensor 110 while the robot 100 performs wall following, the processor 140 may store information on the identified new wall in the memory 130 and control the driver 120 to perform wall following based on the stored information.

Here, the new wall may refer to an unexplored wall detected based on at least one of a distance between the robot 100 and an object around the robot 100 obtained through the sensor 110 and an image obtained by capturing the surroundings of the robot 100 while the robot 100 moves as wall following is performed.

In this case, when one new wall is identified, the processor 140 may store the location information of the identified wall in a queue, when the plurality of new walls are identified, determine priorities of the plurality of new walls, and sequentially store the location information of the plurality of new walls in the queue according to the priorities. A method for determining a priority and a method for storing information on a position of a wall in a queue are the same as described above, and thus a detailed description thereof will be omitted.

As described above, when the wall following of the wall is completed by using the location information of the wall obtained from the queue, the robot 100 may obtain, from the queue, location information of the wall arranged in the next order in the queue, and perform wall following regarding the wall by using the obtained information.

As such, when wall following regarding the wall is completed, the robot 100 may perform wall following regarding a next wall, and for this, the processor 140 may determine whether wall following regarding the wall is completed.

Specifically, when it is identified that loop closing in which the robot 100 rotates the wall once has occurred based on information obtained through the sensor 110 while performing wall following regarding one of the identified walls, the processor 140 may determine that the wall following regarding the wall is completed.

That is, the processor 140 may obtain at least one of a distance between the robot 100 and an object around the robot 100 and an image obtained by capturing surroundings of the robot 100 through the sensor 110 while the robot 100 moves along the wall from a point in time at which the robot 100 starts wall following.

Then, the processor 140 may recognize environment around the robot 100 using the obtained information.

Here, recognizing the environment around the robot 100 may mean recognizing, at the position of the robot 100, whether an object having any shape is located at a point by how far away from the position of the robot 100 in any direction by using the distance between the robot 100 and the object and the image obtained by capturing the surroundings of the robot 100.

In this case, when it is determined that the environment around the robot 100 recognized at a specific time point matches the environment around the robot 100 recognized after a specific point in time while the robot 100 travels along the wall by the wall following, the processor 140 may determine that loop closing in which the robot 100 has rotated the wall once occurs.

In other words, that the same surrounding environment is recognized at a specific point in time and later time may be seen that the robot 100 traveling along the wall is returned to a position at a specific point in time by the wall following, which may mean that the robot 100 rotates the wall once.

Accordingly, when the same surrounding environment is recognized at a specific point in time and later when the robot 100 travels along the wall by the wall following, the processor 140 may determine that the loop closing that the robot 100 rotates the wall one round has occurred.

As such, the processor 140 may, when it is identified that the loop closing has occurred, identify that the wall following regarding the wall is completed.

In this case, the processor 140 may control the driver 120 so that the robot 100 performs wall following regarding a wall having the next order or moves to the exploration point according to whether the location information of the wall having the next order of the wall of which the wall following has been completed is stored in the memory 130.

Specifically, when location information of a wall having a next order of a wall of which wall following has been completed is stored in a queue, the processor 140 may obtain, from the queue, location information of a wall arranged in the next order in the queue, and control the driver 120 to perform wall following regarding the wall by using the obtained location information.

However, when the location information of the wall having the next order of the wall of which wall following has been completed is not stored in the queue, the processor 140 may identify the exploration point on the boundary between the explored area and the unexplored, and control the driver 120 so that the robot 100 move to the exploration point.

As described above, when wall following regarding one wall has been completed, the robot 100 may perform wall following regarding the next wall, and may also perform wall following regarding the next wall even when wall following regarding one wall is stopped.

Specifically, when a specific condition is satisfied while the robot 100 performs wall following regarding the wall, the processor 140 may control the driver 120 to stop the wall following. That is, the processor 140 may stop the wall following, and may control the driver 120 to stop the robot 100.

For example, while wall following regarding one of the identified walls is being performed, the processor 140 may control the driver 120 to stop wall following regarding the wall when the robot 100 moves away from the position where the wall following started by a predetermined distance or more, when a predetermined time or more elapses from the time the wall following started, or when the moving direction of the robot 100 is not changed for a predetermined time after the wall following started.

For example, in a case where after the robot 100 starts wall following, when a lot of time passes, when the robot 100 moves only in one direction, or when the robot 100 moves too far from the starting position of the wall following, the loop closing that the robot 100 rotates along the wall and returns to the original position may not occur and thus, the processor 140 may stop wall following regarding the wall.

In this case, the processor 140 may control the driver 120 such that the robot 100 performs wall following regarding a wall having the next order or moves to the exploration point according to whether location information of a wall having a next order of a wall of which wall following has been stopped is stored in the memory 130.

Specifically, when location information of a wall having a next order of a wall of which wall following has been stopped is stored in a queue, the processor 140 may obtain, from the queue, location information of a wall arranged in the next order in the queue, and control the driver 120 to perform wall following regarding the wall by using the obtained location information.

However, if the location information of the wall having the next order of the wall of which the wall following has been stopped is not stored in the queue, the processor 140 may identify the exploration point on the boundary between the explored area and the unexplored area, and control the driver 120 to move the robot 100 to the exploration point.

Through such a method, the robot 100 may sequentially perform wall following regarding the wall identified around the robot 100 by using the location information of the wall stored in the memory 130.

The processor 140 may control the driver 120 to move the robot 100 to the exploration point in order to generate a map for an unexplored area of a space in which the robot 100 is located after the robot 100 performs wall following.

Here, that the wall following is performed by the robot 100 may mean performing wall following regarding all unexplored walls identified around the robot 100 by using the location information of the wall stored in the memory 130. In this case, the robot 100 may perform wall following regarding the wall, thereby completing wall following or stopping wall following.

In detail, if the robot 100 performs wall following, the processor 140 may identify a boundary between the explored area and the unexplored area, identify an exploration point on the boundary, and control the driver 120 to move the robot 100 to the exploration point.

In addition, the processor 140 may control the driver 120 such that, when at least one wall is identified through the sensor 110 while the robot 100 moves to the exploration point or after the robot 100 moves to the exploration point, the robot 100 performs wall following in which the robot 100 travels along the identified wall.

That is, the processor 140 may control the driver 120 such that the robot 100 performs wall following by using location information of the wall stored in the queue, explore an area around the robot 100 through the sensor 110 while the robot 100 moves according to the wall following, and generate a map for an area around the robot 100 by using the explored information. Then, when the location information of the wall stored in the queue is no longer present as the wall following is performed, the processor 140 may identify a boundary between the explored area and the unexplored area on the map and identify the exploration point on the boundary. Then, when at least one wall is identified through the sensor 110 while the processor 140 moves to the exploration point or after the robot 100 moves to the exploration point, the processor 140 may store information on the identified wall in the memory 130 and control the driver 120 such that the robot 100 performs wall following regarding the wall by using the stored information on the wall.

Consequently, the processor 140 may generate a map for a space by exploring areas in a space through the above method.

FIGS. 4A to 4I are diagrams illustrating an example of a method of generating a map through wall following according to an embodiment of the disclosure.

Figure 4A:
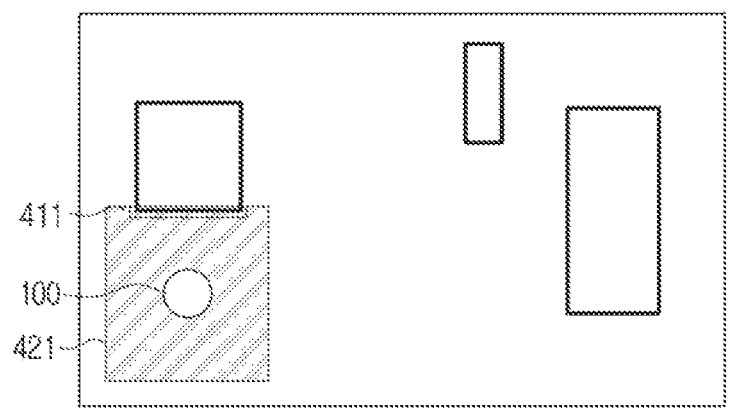
FIGS. 4A to 4I are diagrams illustrating an example of a method of generating a map through wall following according to an embodiment of the disclosure.

First, as shown in FIG. 4A, the robot 100 may explore an area 421 around the robot 100 by using the sensor 110. Accordingly, when the unexplored wall 411 is identified, the robot 100 may store the location information w1 of the wall 411 in the queue 430. In addition, the robot 100 may generate a map for the explored area 421 by using information obtained through the sensor 110.

Figure 4B:
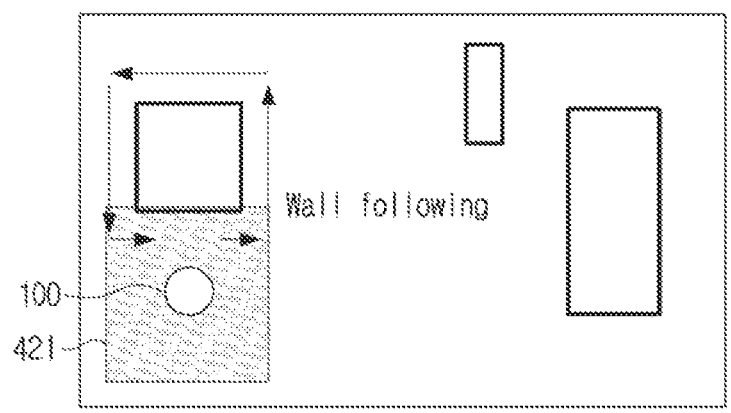

In addition, as shown in FIG. 4B, the robot 100 may obtain location information w1 of the wall 411 from the queue 430 and perform wall following regarding the wall 411 by using the location information w1 of the wall 411.

Figure 4C:
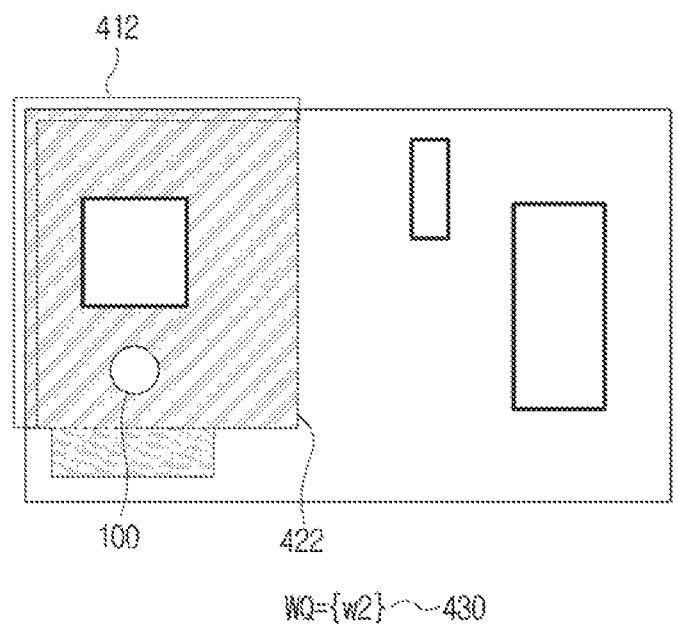

In this case, as shown in FIG. 4C, the robot 100 may explore an area 422 around the robot 100 by using the sensor 110 while performing the wall following regarding the wall 411. Accordingly, when the unexplored wall 412 is identified, the robot 100 may store the location information w2 of the wall 412 in the queue 430. In addition, the robot 100 may generate a map for the explored area 421 by using information obtained through the sensor 110.

Figure 4D:
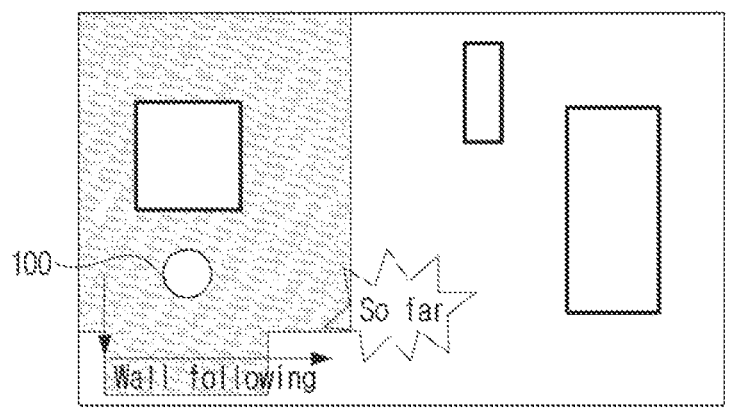

When it is identified that loop closing has occurred while performing the wall following along the wall 411, the robot 100 may determine that the wall following regarding the wall 411 has been completed, obtain location information w2 of the wall 412 from the queue 430 as shown in FIG. 4D, and perform wall following regarding the wall 412 by using the location information w2 of the wall 412.

Figure 4E:
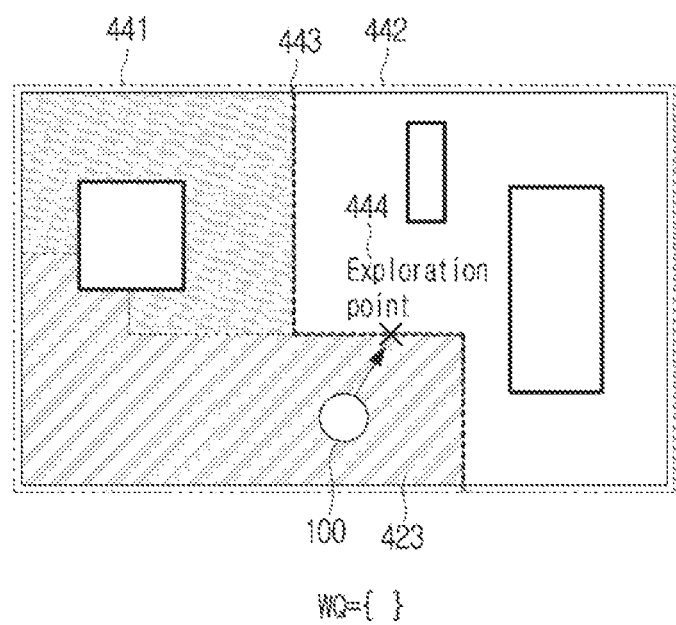

In this case, as shown in FIG. 4D, the robot 100 may stop wall following regarding the wall 412 in that the robot 100 has moved away from the starting position of the wall following by a predetermined distance or more. As shown in FIG. 4E, while performing the wall following regarding the wall 412, the robot 100 may explore an area 423 around the robot 100 by using the sensor 110, and generate a map for the explored area 423 by using the information obtained through the sensor 110.

The robot 100 may move to an exploration point in that the location information on a wall is not present in the queue.

Specifically, as shown in FIG. 4E, the robot 100 may identify an exploration point 444 on a boundary 443 between an explored area 441 and an unexplored area 442 and move to the exploration point 444.

Figure 4F:
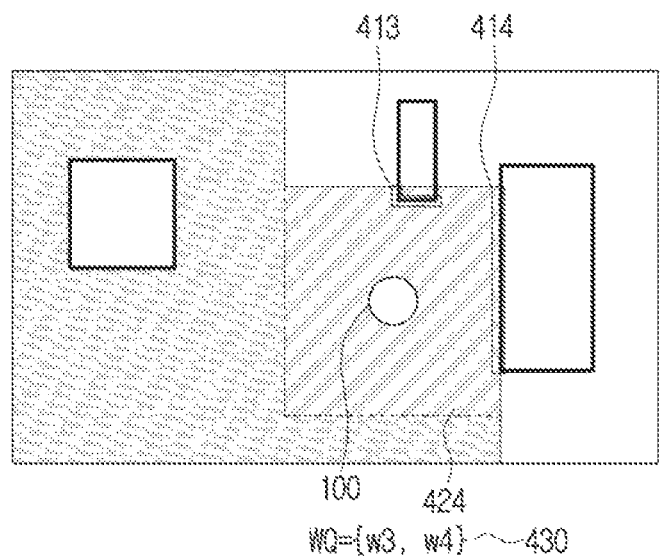

As shown in FIG. 4F, while the robot 100 moves to the exploration point 444, the robot 100 may explore an area 424 around the robot 100 by using the sensor 110. Accordingly, when the unexplored walls 413 and 414 are identified, the robot 100 may store the location information w3 of the wall 413 and the location information w4 of the wall 414 in the queue 430. In addition, the robot 100 may generate a map for the explored area 424 by using information obtained through the sensor 110.

In this case, the robot 100 may determine the priorities of the plurality of walls 413 and 414 in that the plurality of walls 413 and 414 are identified, and store the location information w3 of the wall 413 and the location information w4 of the wall 414 in the queue 430 according to the priorities.

For example, as shown in FIG. 4F, in that the corner is not identified at the wall 414 while the direction of the corner identified at the wall 413 faces the robot 100, the robot 100 may determine that the priority of the wall 413 is higher than the priority of the wall 414, and store the location information w3 of the wall 413 and the location information w4 of the wall 414 in the queue 430 in the order of w3 and w4.

Figure 4G:
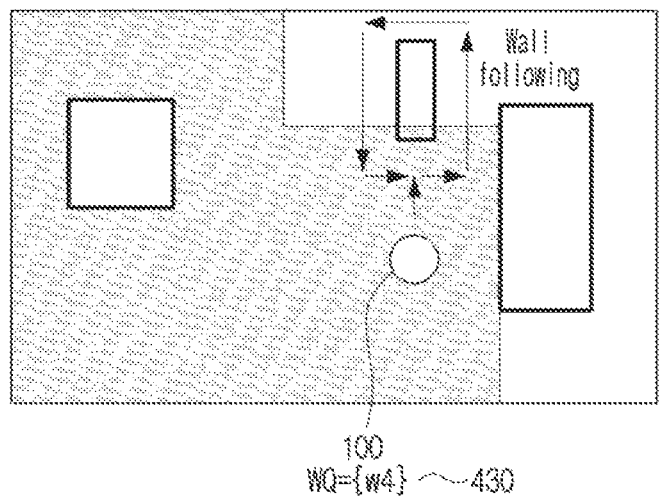

In addition, as shown in FIG. 4G, the robot 100 may obtain location information w3 of the wall 413 from the queue 430 and perform wall following regarding the wall 413 by using the location information w3 of the wall 413.

Figure 4H:
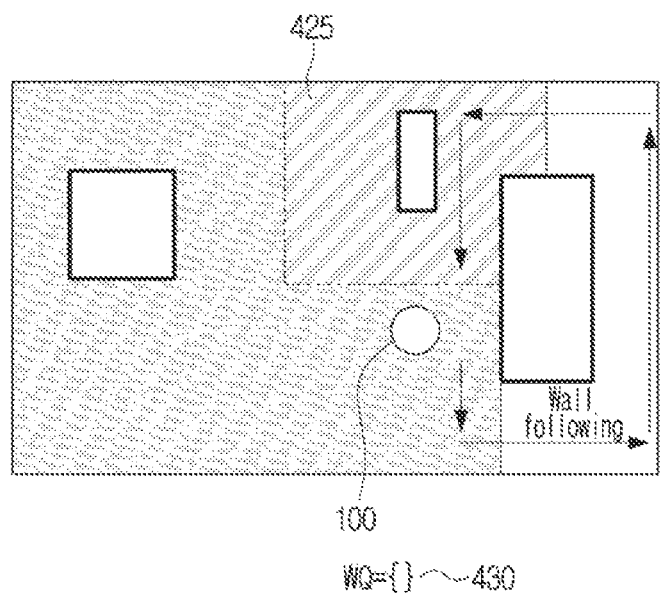

In this case, as shown in FIG. 4H, the robot 100 may explore an area 425 around the robot 100 by using the sensor 110 while performing wall following regarding the wall 413. In addition, the robot 100 may generate a map for the explored area 425 using the information obtained through the sensor 110.

When it is identified that loop closing has occurred while performing the wall following along the wall 413, the robot 100 determines that the wall following regarding the wall 413 is completed, and as shown in FIG. 4H, the robot 100 obtains the location information w4 of the wall 414 from the queue 430, and performs wall following regarding the wall 414 by using the location information w4 of the wall 414.

Figure 4I:
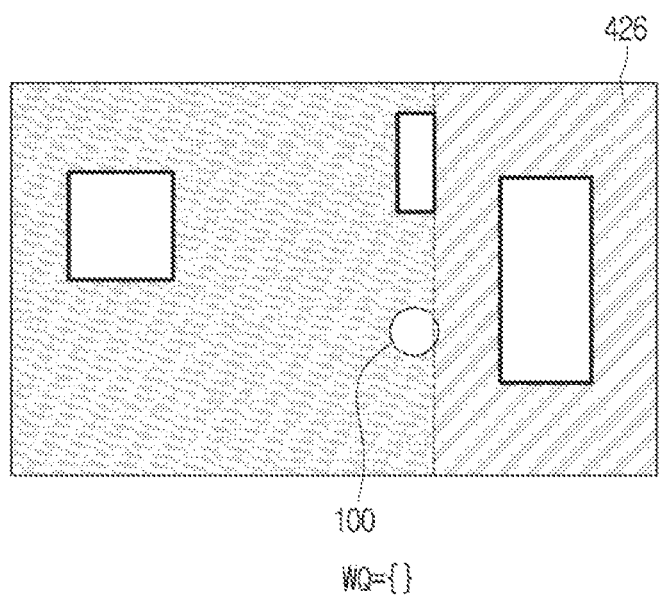

In this case, as shown in FIG. 4I, the robot 100 may explore an area 426 around the robot 100 using the sensor 110 while performing wall following regarding the wall 414. In addition, the robot 100 may generate a map for the explored area 426 using the information obtained through the sensor 110.

Consequently, the robot 100 may generate a map for the space by exploring areas in a space through the method.

As such, in the disclosure, when the robot 100 generates a map, a map around the robot 100 may be generated while moving to form a loop through wall following, thereby generating a map with improved accuracy.

Particularly, when a map is generated based on a pose graph having a pose as a node and an odometry measurement between nodes as an edge, a map is generated based on the sensing information accumulated for each pose. At this time, when the loop closing is performed, the edges connected between the nodes are optimized so that each pose is optimized, thereby improving the accuracy of the map. Accordingly, in the disclosure, when a map is generated, the possibility of forming a loop by returning the robot 100 back to its own position through wall following may be increased, thereby generating a more accurate map.

In the above-described example, it has been described that the robot 100 performs wall following along the wall. However, according to an embodiment, the robot 100 may form loop closing even if the robot 100 does not travel along the wall.

Figure 5A:
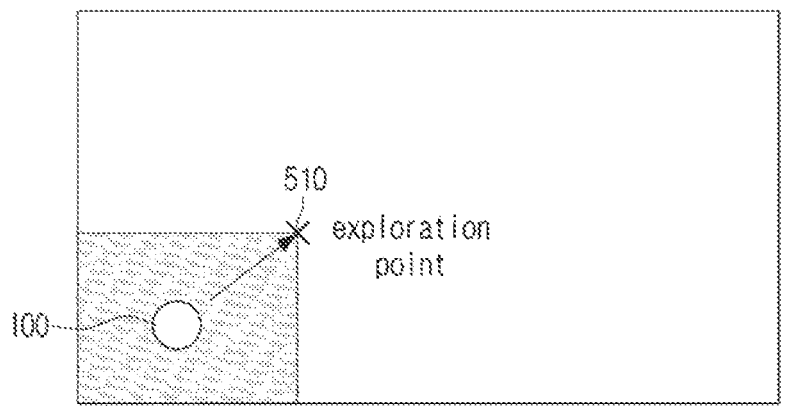
FIGS. 5A and 5B are diagrams illustrating a method of forming loop closing when a robot does not perform wall following according to an embodiment of the disclosure.
Figure 5B:
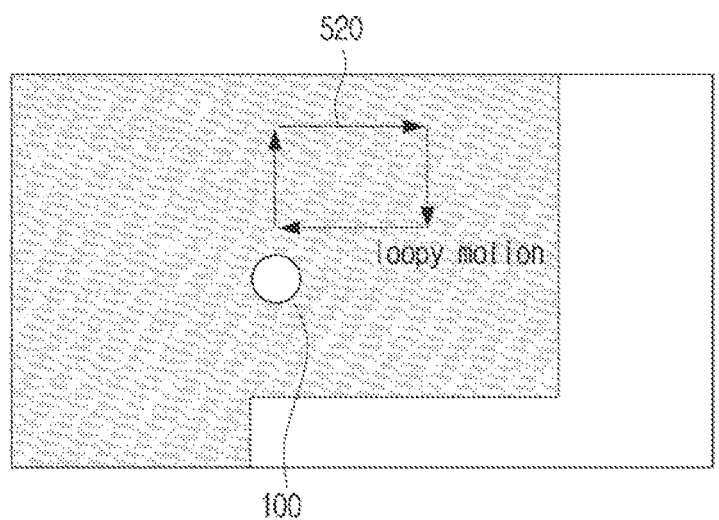

For example, as shown in FIG. 5A, the processor 140 may control the driver 120 to move the robot 100 to the exploration point 510. In addition, as shown in FIG. 5B, the processor 140 may control the driver 120 such that the robot 100 moves along a path 520 having a predetermined size and shape from the exploration point 510 and returns to the exploration point 510. This type of travelling may be referred to as a loopy motion. In addition, the processor 140 may again identify the exploration point based on the explored area while moving along the path 520, and control the driver 120 to move to the exploration point.

Consequently, the processor 140 may perform the above-described process to generate a map while forming loop closing even if the robot 100 does not perform wall following.

Figure 6:
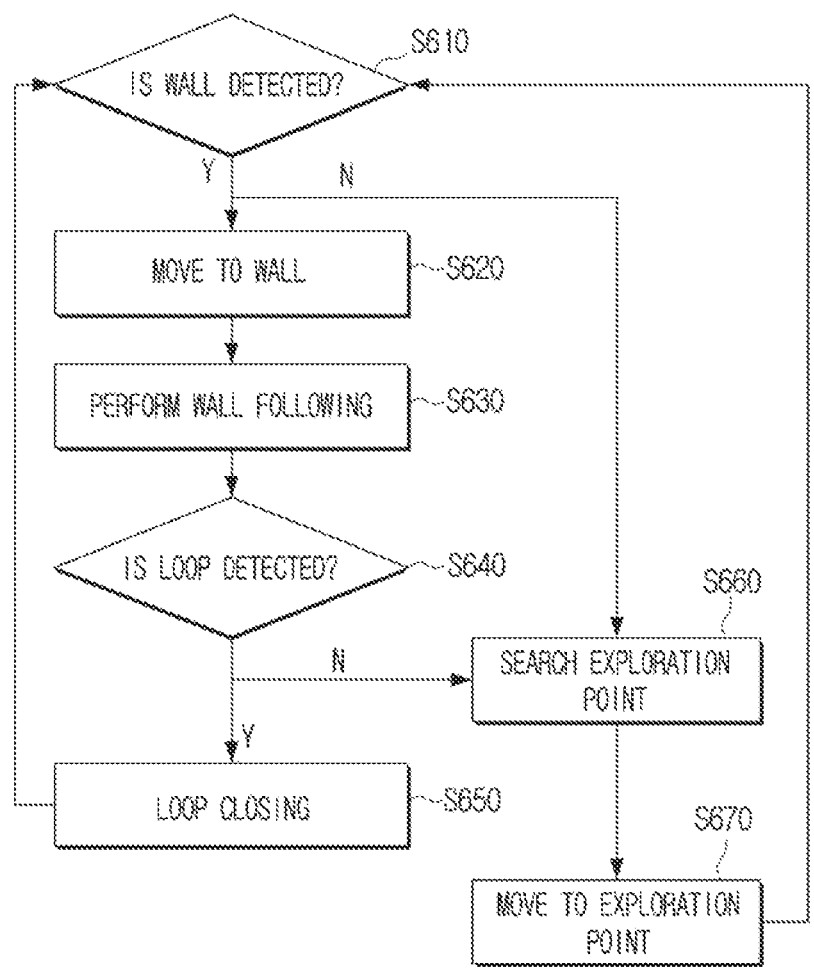
FIG. 6 is a flowchart illustrating a method of generating a map by a robot according to an embodiment of the disclosure.

FIG. 6 is a flowchart illustrating a method of generating a map by a robot according to an embodiment of the disclosure.

First, when the wall is detected in operation S610-Y, the robot 100 may move to the wall in operation S620, and may perform wall following moving along the wall in operation S630. In this case, the robot 100 may explore an area around the robot 100 through the sensor 110 while performing the wall following, and generate a map for an area around the robot 100 by using the explored information.

In addition, the robot 100 may, when a loop is detected while performing wall following in operation S640-Y, determine that loop closing occurs in operation S650. In this case, the robot 100 may determine that wall following regarding the wall is completed, and may determine whether location information about another wall is stored in the memory 130 in operation S610.

In this case, when location information about a wall is stored, the robot 100 may perform the above-described process for the wall.

However, if the location information about a wall is not stored in operation S610-N, the robot 100 may search for an exploration point in operation S660 and may move to an exploration point in operation S670. In addition, when the wall is detected during or after the robot 100 moves to the exploration point, the robot 100 may perform the above-described process on the detected wall.

If the loop is not detected while performing the wall following in operation S640-N, the robot 100 may search for an exploration point in operation S660 and may move to the exploration point in operation S670. In addition, when the wall is detected during or after moving to the exploration point, the robot 100 may perform the above-described process on the detected wall. However, if the loop is not detected while performing the wall following, the robot 100 may determine whether location information about another wall is stored in the memory 130, and when the location information about the wall is stored, the robot 100 may perform the above-described process on the wall.

In this disclosure, through the wall following, a precise map may be generated.

Figure 7A:
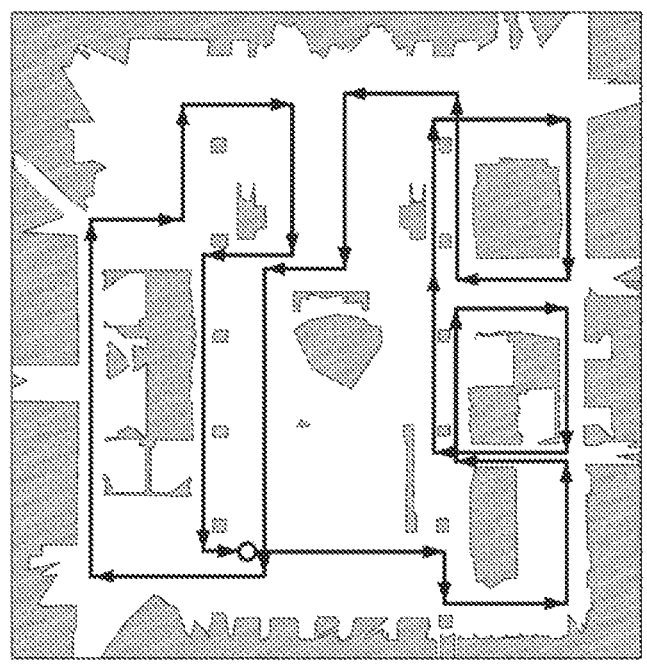
FIGS. 7A, 7B, 8A and 8B are diagrams illustrating quality of the generated map when the map is generated according to an embodiment of the disclosure.
Figure 7B:
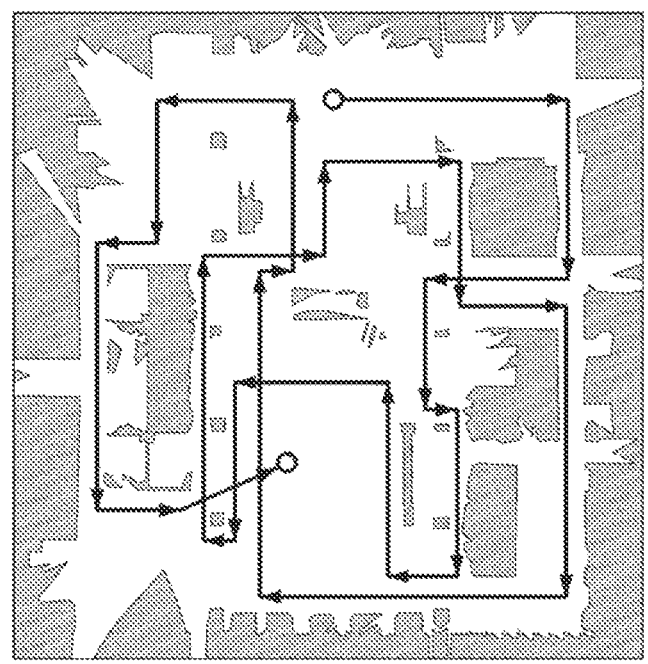

FIGS. 7A, 7B and 8 are diagrams illustrating quality of the generated map when the map is generated according to an embodiment of the disclosure.

FIG. 7A and FIG. 7B show a path along which a robot has traveled in order to generate a map and a map generated according to the path. Specifically, in FIG. 7A, wall following is performed according to the disclosure when the robot travels in a space, and the robot does not perform wall following in FIG. 7B.

Figure 8A:
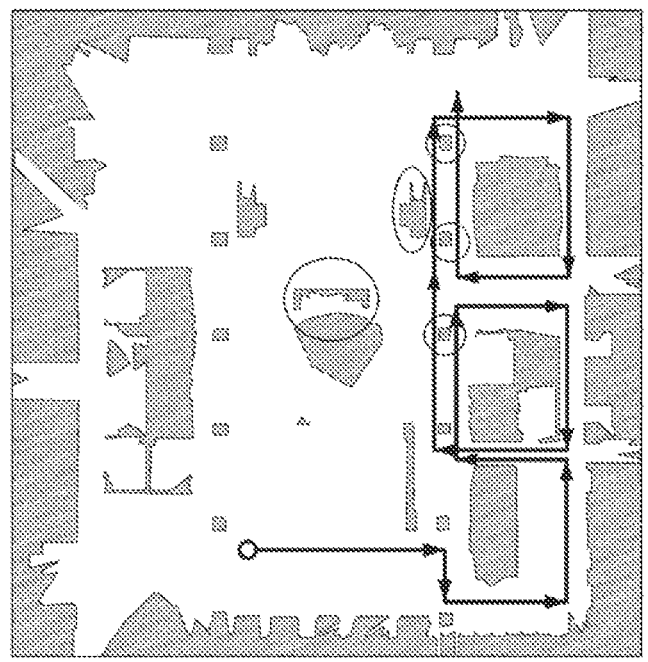
Figure 8B:
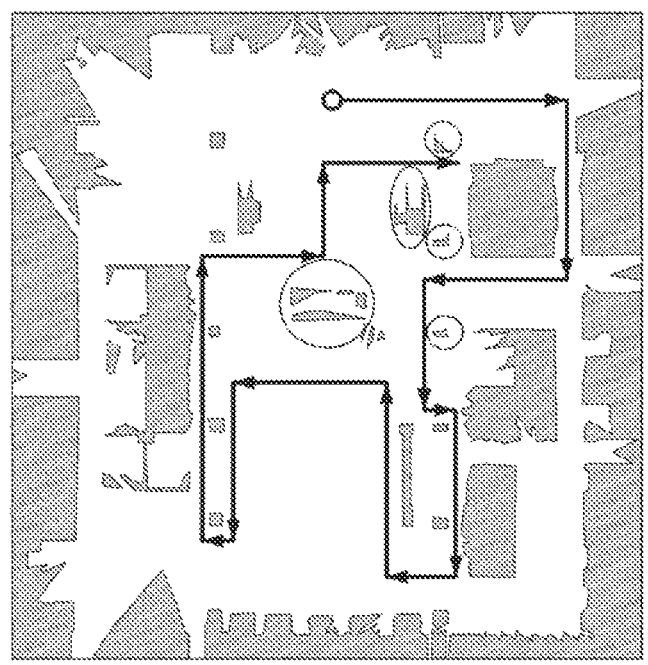

In this case, referring to FIG. 8A, when performing wall following according to the disclosure, the robot is traveled to form a plurality of small loops, and referring to FIG. 8B, the robot is traveled to form one large loop.

Accordingly, referring to a part in which a circle is displayed in the map of FIG. 8A, a map of an accurate form is generated when wall following is performed, whereas, referring to a part in which a circle is displayed in the map of FIG. 8B, a distorted map is generated. Also, in the map of FIG. 8B, it can be seen that a part that does not form a small-sized loop has a distorted shape.

As such, a more precise map may be generated through wall following according to the disclosure.

Figure 9:
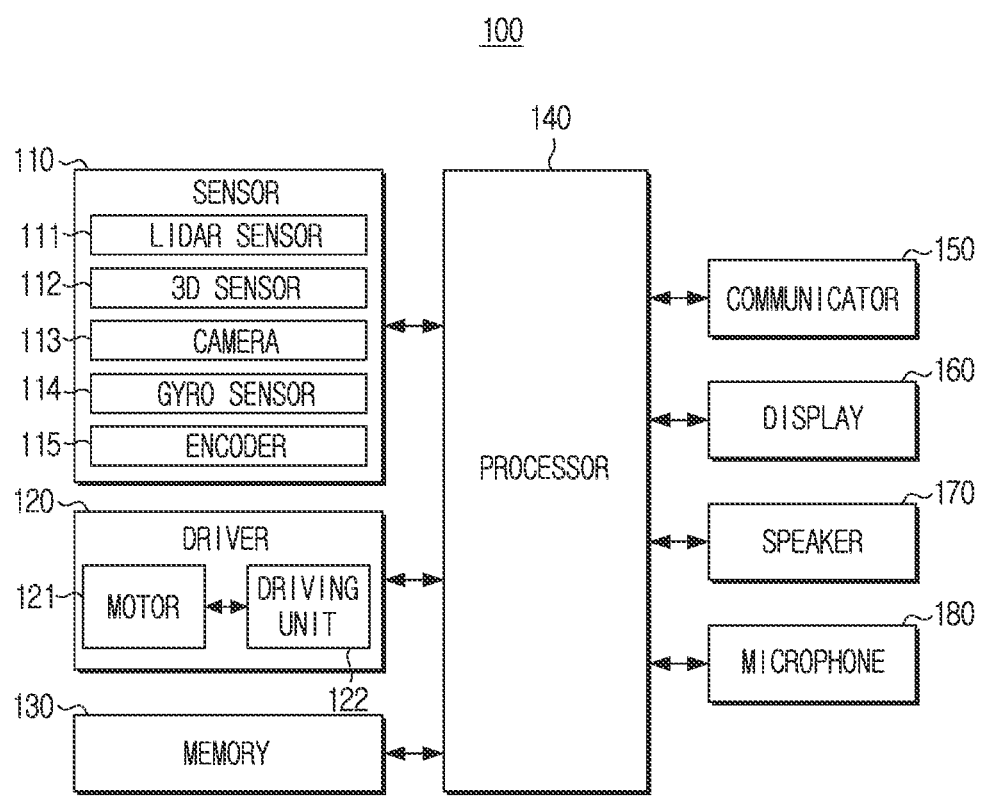
FIG. 9 is a block diagram illustrating a detailed configuration of a robot according to an embodiment of the disclosure.

FIG. 9 is a block diagram illustrating a detailed configuration of a robot according to an embodiment of the disclosure.

As shown in FIG. 9, the robot 100 according to the disclosure may further include the sensor 110, the driver 120, the memory 130, and the processor 140, and may also include a communicator 150, a display 160, a speaker 170, a microphone 180, and the like. However, in practicing the disclosure, a new configuration may be added or some components may be omitted in addition to such a configuration. In the description of FIG. 9, parts overlapping with those already described will be omitted or shortened.

The sensor 110 may obtain various information related to the surroundings of the robot 100 and the robot 100. In this case, the sensor 110 may include a LiDAR sensor 111, a 3D sensor 112, a camera 113, a gyro sensor 114, and an encoder 115.

The driver 120 may move the robot 100. Here, the driver 120 may include a motor 121 and a driving unit 122 connected to the motor 121. The driving unit 122 may be implemented as a wheel or a leg of a robot. The motor 121 may control the driving unit 122 under the control of the processor 140 to control various driving operations such as movement, stop, speed control, and direction change of the robot 100.

The communicator 150 communicates with an external device. The processor 140 may transmit various data to an external device through the communicator 150 and receive various data from an external device.

For example, the communicator 150 may communicate with various external devices through a wireless communication method such as Bluetooth (BT), Bluetooth Low Energy (BLE), Wireless Fidelity (Wi-Fi), ZigBee, or the like, or an infrared communication (IR) communication method. The communicator 150 may be mounted on the processor 140, and may be included in the robot 100 as a configuration separate from the processor 140.

The display 160 may display various screens. For example, the processor 140 may display a map of a space in which the robot 100 is located, a path on the map, a description of a product located in the space, and the like through the display 160.

The display 160 may be implemented as various types of displays such as a liquid crystal display (LCD) display, a plasma display panel (PDP), and the like. The display 160 may also include a driving circuit, a backlight unit, or the like, which may be implemented in the form of an a-si TFT, a low temperature poly silicon (LTPS) TFT, an organic TFT (OTFT), or the like.

The display 160 may be combined with a touch sensor to be implemented as a touch screen. In this case, the processor 140 may receive a user command through the display 160 and display various screens according to a user command.

The speaker 170 may output audio. Specifically, the processor 140 may output various notification sounds or voice guidance messages related to the operation of the robot 100 through the speaker 170. For example, the processor 140 may output a voice guidance message for guiding a path on the map, a voice guidance message for description of the product, and the like through the speaker 170.

The microphone 180 may receive a voice. The voice may include a user command for controlling an operation of the robot 100. In this case, the processor 140 may recognize a voice input through the microphone 180 and control various operations of the robot 100 according to the recognized voice. For example, when a voice for requesting route guidance to a specific location in a space is received, the processor 140 may display a path on the map through the display 160.

Figure 10:
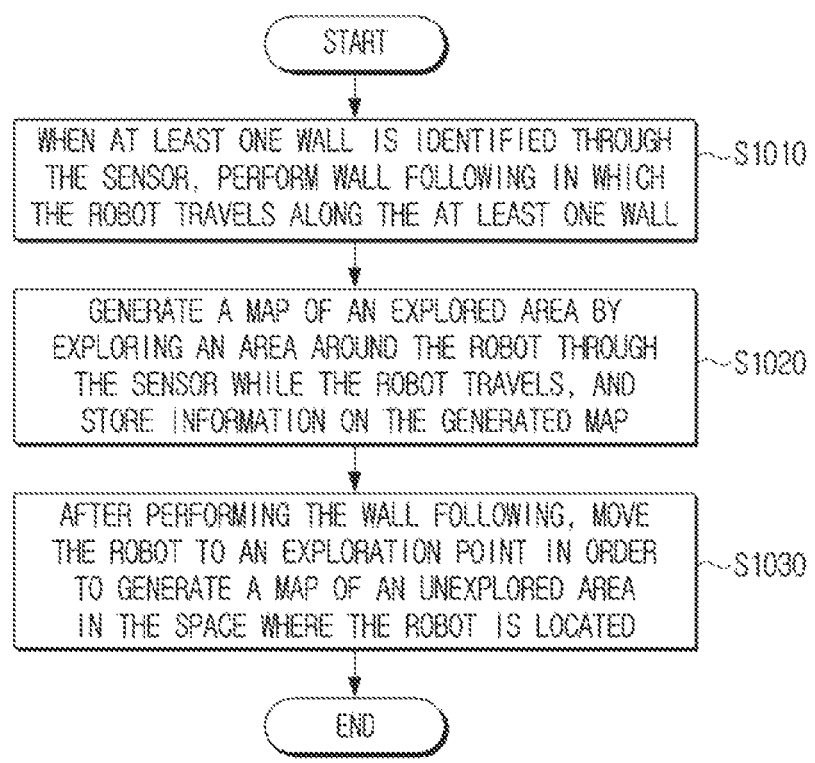
FIG. 10 is a flowchart illustrating a method of generating a map of a robot according to an embodiment of the disclosure.

FIG. 10 is a flowchart illustrating a method of generating a map of a robot according to an embodiment of the disclosure.

First, when at least one wall is identified through the sensor, wall following in which the robot travels along the at least one wall is performed in operation S1010.

Thereafter, a map of an explored areas is generated by exploring an area around the robot through the sensor while the robot travels to, and information on the generated map is stored in operation S1020.

In addition, after performing the wall following, the robot moves to an exploration point in order to generate a map of an unexplored area in the space where the robot is located in operation S1030.

In operation S1010, information on the at least one wall may be stored and the wall following may be performed based on the stored information.

Here, when a plurality of walls are identified through the sensor, priorities of the plurality of walls may be determined based on corner directions of the plurality of walls and a distance between the plurality of walls and the robot, and information on the plurality of walls may be stored in the memory according to the priorities.

In this case, the method may include identifying at least one wall, from among the plurality of unexplored walls, of which a corner direction faces the robot, and determining that at least one wall of which the corner direction faces the robot has a higher priority than the remaining walls, with respect to at least one wall of which the corner direction faces the robot, determining that the wall has a higher priority in order of the wall close to the robot, and with respect to remaining walls, determining that the wall has a higher priority in order of the wall close to the robot.

In addition, in operation S1010, the wall following may be sequentially performed from a wall having the highest priority among the identified walls based on the stored information.

In operation S1010, if a new wall is identified through the sensor during wall following, information on the identified new wall may be stored and the wall following may be performed based on the stored information.

In addition, in operation S1010, when it is identified that a loop closing in which a robot rotates the wall once has occurred based on information obtained through a sensor while performing wall following regarding one of the identified walls, the wall following regarding the wall may be determined to be completed.

In addition, in operation S1010, wall following regarding the wall may be stopped when, while performing wall following regarding one of the identified walls, the robot moves away from the position where the wall following started by a predetermined distance or more, a predetermined time or more has elapsed from the time when the wall following started, or a moving direction of the robot is not changed for a predetermined time after the wall following started.

In operation S1030, when the robot performs the wall following, a boundary between the explored area and the unexplored area may be identified, an exploration point may be identified on the identified boundary, and the robot may move to the exploration point.

In addition, when at least one wall is identified through the sensor while moving to the exploration point, a wall following in which a robot travels along the identified wall may be performed.

A detailed method of performing wall following in a process of generating a map by the robot has been described above.

A non-transitory computer readable medium in which a program for sequentially performing a method for generating a map of a robot according to the disclosure is stored may be provided.

A machine-readable storage medium may be provided in the form of a non-transitory storage medium. Herein, the term "non-transitory" only denotes that a storage medium does not include a signal (e.g., electromagnetic wave) but is tangible, and does not distinguish the case in which a data is semi-permanently stored in a storage medium from the case in which a data is temporarily stored in a storage medium. For example, "non-transitory storage medium" may refer to a buffer temporarily storing data.

According to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™) In a case of the online distribution, at least a portion of the computer program product (e.g., downloadable app) may be at least temporarily stored or provisionally generated on the storage media such as a manufacturer's server, the application store's server, or a memory in a relay server.

Each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration.

Operations performed by a module, a program, or other component, according to various embodiments, may be sequential, parallel, or both, executed iteratively or heuristically, or at least some operations may be performed in a different order, omitted, or other operations may be added.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

The various embodiments described above may be implemented as software including instructions stored in a machine-readable storage media which is readable by a machine (e.g., a computer). The device may include the electronic device according to the disclosed embodiments, as a device (e.g., robot 100) which calls the stored instructions from the storage media and which is operable according to the called instructions.

When the instructions are executed by a processor, the processor may directory perform functions corresponding to the instructions using other components or the functions may be performed under a control of the processor. The instructions may include code generated or executed by a compiler or an interpreter.

While example embodiments of the disclosure have been shown and described, the disclosure is not limited to the aforementioned example embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A robot comprising:
a sensor configured to sense an environment of the robot;
a driver configured to drive movement of the robot;
at least one memory storing one or more instructions; and
at least one processor configured to execute the one or more instructions,
wherein the one or more instructions, when executed by the at least one processor, cause the robot to:
based on identifying at least one wall through the sensor, control the driver to cause the robot to perform wall following in which the robot travels along the at least one wall,
generate a map of an explored area by exploring an area in a vicinity of the robot through the sensor while the robot travels,
store information on the generated map in the at least one memory,
based on the robot completing the wall following, control the driver to cause the robot to move to an exploration point in an unexplored area in the vicinity of the robot,
based on identifying a plurality of walls through the sensor, determine priorities of the plurality of walls based on a corner direction of each wall of the plurality of walls and a distance between each wall of the plurality of walls and the robot, wherein for each wall of the plurality of walls the corner direction comprises a direction facing away from a vertex of a reflex angle formed by a corner in the wall, and
store information related to the plurality of walls in the at least one memory according to the determined priorities.

2. The robot of claim 1, wherein the one or more instructions, when executed by the at least one processor, cause the robot to:
store information related to the at least one wall in the at least one memory, and control, based on the stored information related to the at least one wall, the driver to cause the robot to perform the wall following.

3. The robot of claim 2, wherein the one or more instructions, when executed by the at least one processor, cause the robot to, based on identifying a new wall through the sensor while the robot performs the wall following along the at least one wall, store information on the new wall in the at least one memory and control the driver to cause the robot to perform wall following along the new wall based on the stored information.

4. The robot of claim 1, wherein the one or more instructions, when executed by the at least one processor, cause the robot to:
identify the at least one wall, from among the plurality of walls, based on the at least one wall having a corner direction facing the robot,
determine that the at least one wall having the corner direction facing the robot has a higher priority than remaining walls among the plurality of walls,
determine that the at least one wall has a higher priority than a wall closest to the robot from among the plurality of walls, and
determine, for each respective remaining wall of the plurality of walls other than the at least one wall, that the respective remaining wall has a higher priority than the wall closest to the robot, and
wherein a priority of a given wall among the plurality of walls is inversely proportional to a distance between the given wall and the robot.

5. The robot of claim 1, wherein the one or more instructions, when executed by the at least one processor, cause the robot to, based on the priorities of the plurality of walls and the stored information related to the plurality of walls, control the driver to cause the robot to sequentially perform wall following along each wall of the plurality of walls.

6. The robot of claim 1, wherein the one or more instructions, when executed by the at least one processor, cause the robot to:
based on information obtained through the sensor, identify that the robot has returned to a position where the wall following along the at least one wall began, and
based on the identifying that the robot has returned to the position where the wall following along the at least one wall began, determine that the wall following along the at least one wall is complete.

7. The robot of claim 1, wherein the one or more instructions, when executed by the at least one processor, cause the robot to, based on at least one of the robot moving a predetermined distance from a position where the wall following along the at least one wall began, a predetermined time elapsing from a time when the wall following along the at least one wall began, or a moving direction of the robot remaining unchanged for a predetermined time after the wall following along the at least one wall began, control the driver to cause the robot to stop the wall following along the at least one wall.

8. The robot of claim 1, wherein the one or more instructions, when executed by the at least one processor, cause the robot to:
identify a boundary between the explored area and the unexplored area, wherein the boundary is part of the unexplored area, and
wherein the exploration point is adjacent to the boundary.

9. The robot of claim 1, wherein the one or more instructions, when executed by the at least one processor, cause the robot to, based on identifying at least one wall through the sensor while the robot moves to the exploration point, control the driver to cause the robot to travel along the at least one wall.

10. A method of generating a map using a robot including a sensor, the method comprising:
identifying at least one wall through the sensor of the robot;
performing wall following in which the robot travels along the at least one wall;
generating a map of an explored area by exploring an area in a vicinity of the robot through the sensor while the robot travels;
storing information on the generated map in a memory of the robot;
based on the robot completing the wall following, moving the robot to an exploration point in an unexplored area in the vicinity of the robot;
identifying a plurality of walls through the sensor including the at least one wall;
based on the identifying the plurality of walls through the sensor, determining priorities of the plurality of walls based on corner directions of each wall of the plurality of walls and a distance between each wall of the plurality of walls and the robot, wherein for each wall of the plurality of walls the corner direction comprises a direction facing away from a vertex of a reflex angle formed by a corner in the wall; and
storing information related to the plurality of walls in the memory according to the priorities.

11. The method of claim 10, wherein the performing wall following comprises storing information related to the at least one wall and performing the wall following along the at least one wall based on the stored information.

12. The method of claim 10, wherein the identifying the at least one wall through the sensor further comprises:
identifying the at least one wall, from among the plurality of walls, based on the at least one wall having a corner direction facing the robot;
determining that the at least one wall having the corner direction facing the robot has a higher priority than remaining walls among the plurality of walls,
determining that the at least one wall has a higher priority than a wall closest to the robot from among the plurality of walls; and
determining, for each respective remaining wall of the plurality of walls other than the at least one wall, that the respective remaining wall has a higher priority than the wall closest to the robot, and
wherein a priority of a given wall among the plurality of walls is inversely proportional to a distance between the given wall and the robot.

13. The method of claim 10, further comprising:
based on the robot completing the wall following, sequentially performing wall following along each remaining wall of the plurality of walls based on the priorities and the stored information.

14. A non-transitory computer readable recording medium storing computer instructions, which when executed by at least one processor, cause the at least one processor to execute a method of generating a map using a robot including a sensor, the method comprising:
identifying at least one wall through the sensor;
performing wall following in which the robot travels along the at least one wall;
generating a map of an explored area by exploring an area in a vicinity of the robot through the sensor while the robot travels;

storing information on the generated map in a memory of the robot;

based on the robot completing the wall following, moving the robot to an exploration point in an unexplored area in the vicinity of the robot;

identifying a plurality of walls through the sensor including the at least one wall;

based on the identifying the plurality of walls through the sensor, determining priorities of the plurality of walls based on corner directions of each wall of the plurality of walls and a distance between each wall of the plurality of walls and the robot, wherein for each wall of the plurality of walls the corner direction comprises a direction facing away from a vertex of a reflex angle formed by a corner in the wall; and storing information related to the plurality of walls in the memory according to the priorities.

15. The non-transitory computer readable recording medium of claim 14, wherein the performing wall following comprises storing information related to the at least one wall and performing the wall following along the at least one wall based on the stored information.

16. The non-transitory computer readable recording medium of claim 14, wherein the identifying the at least one wall through the sensor further comprises:

identifying the at least one wall, from among the plurality of walls, based on the at least one wall having a corner direction facing the robot;

determining that the at least one wall having the corner direction facing the robot has a higher priority than remaining walls among the plurality of walls, determining that the at least one wall has a higher priority than a wall closest to the robot from among the plurality of walls; and determining, for each respective remaining wall of the plurality of walls other than the at least one wall, that the respective remaining wall has a higher priority than the wall closest to the robot, and wherein a priority of a given wall among the plurality of walls is inversely proportional to a distance between the given wall and the robot.

17. The non-transitory computer readable recording medium of claim 14, wherein the method further comprises:

based on the robot completing the wall following, sequentially performing wall following along each remaining wall of the plurality of walls based on the priorities and the stored information.

\* \* \* \* \*